L. M. HOSEA.
UNIVERSAL JOINT.
APPLICATION FILED APR. 13, 1908.
960,327.
Patented June 7, 1910.
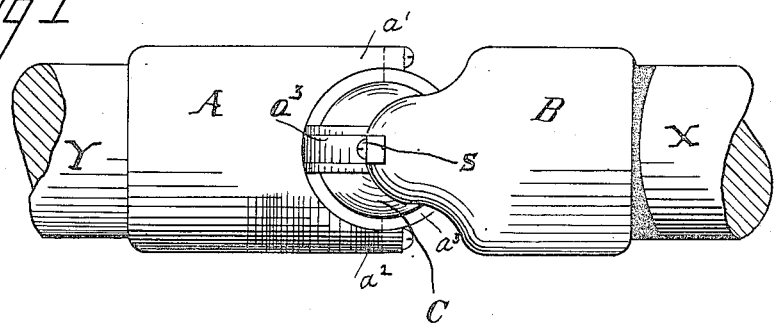
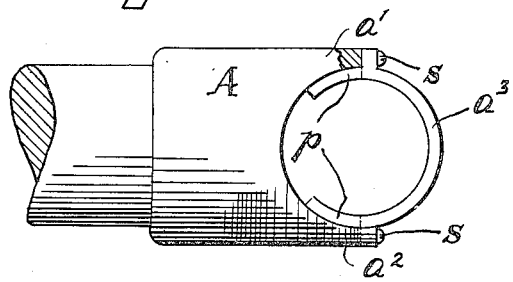
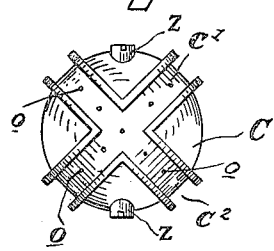
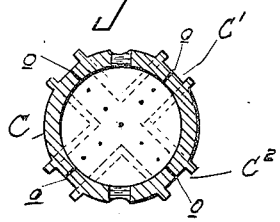
Witnesses
Carroll H Richards
Joseph R Gardner
Inventor
Lewis M. Hosea

UNITED STATES PATENT OFFICE.

LEWIS M. HOSEA, OF CINCINNATI, OHIO.

UNIVERSAL JOINT.

960,327.

Specification of Letters Patent. Patented June 7, 1910.

Application filed April 13, 1908. Serial No. 426,765.

*To all whom it may concern:*

Be it known that I, LEWIS M. HOSEA, a citizen of the United States, residing at Cincinnati, in the county of Hamilton and State of Ohio, have invented new and useful Improvements in Universal Joints, of which the following is a specification.

My invention relates to the class of devices commonly known as "universal joints" used to connect two shafts, in tandem and somewhat angular relations, rotatively; its object being to produce a relatively strong, cheap and compact coupling that shall be automatically self-centering and also self-lubricating.

To this end my invention consists of the device herein described, embodying bifurcated couplers and a spherical central element circumferentially grooved, through and by means of which rotation is transmitted;—said sphere or ball being made integral and hollow and used as an oil reservoir for automatic lubrication of the rubbing surfaces.

My invention is illustrated in the accompanying drawings, in which:—

Figure 1 is a view of the coupling complete. Fig. 2 is a view of one of the couplers detached. Fig. 3 is a view of the central transmitting element and lubricator; and Fig. 4 is a cross section of same in a diametric plane through the center line of the oil-filling apertures.

Referring now to the drawings: A, and B, designate two couplers which are adapted to be attached to the contiguous ends of the shafts Y and X, respectively, and engage the central ball C, as hereinafter described, through which the rotation of one shaft is transmitted to the other in angular relations. The couplers are duplicates, one of the other;—each, as A, consisting of a cylindrical sleeve terminating in jaw-shaped prongs, $a^1$, $a^2$ which constitute the extremities of a semi-circular connecting arc. At the inner side of each prong, extending from the extremity along the arc surface, is a stud or projection $p$, integral with the prong. The stud is of rectangular cross section and is a segment of an annulus concentric with the arc connecting and forming the inner surface of the prongs. The studs are connected around the projected outer half of the same circle by a removable strap or yoke $a^3$, turned diametrically outward at its ends and held against seats on the outer end of the studs by screws $s$. I prefer to extend the material of the prongs slightly forward adjacent to the sides of the strap, as shown, forming a sort of socket to more thoroughly secure the strap against side pressure.

The central element,—the hollow sphere C,—is preferably cast with two peripheral slightly raised ridges crossing opposite poles of the sphere at right angles and in each ridge is sunk a rectangular circumferential groove,—$c^1$, $c^2$ respectively,—corresponding with the cross-sectional dimensions of the studs $p$, and connecting straps $a^3$, which have a sliding fit in the grooves. In the spaces between the grooved ridges, screw holes and suitable plugs, $z$, are provided for filling the hollow interior of the sphere with oil, which, when the device is in operation, exudes through minute orifices, $o$, extending through the shell to the bottom of the grooves, by the joint action of centrifugal force and capillarity, to lubricate the contacting surfaces of the straps and studs.

The connection of the parts when assembled is clearly shown in Fig. 1, and the details of construction in the remaining figures. It will be readily apparent that the side-thrust of the straps and studs of one coupler against the side walls of the grooves of the sphere compels the rotation of the latter by the driving shaft, which motion is communicated by similar interaction of corresponding parts of the other coupler in inverse order to the driven shaft. It will also be seen that by the partial rotation of the straps and studs longitudinally in the grooves, the device is automatically self-centering.

Referring to the constructive features of the device, it will be seen that these involve only simple, economical, and well understood manipulations or ordinary machine tools; and that the relation of parts under stress is such as to attain a maximum of resisting strength with the minimum of friction and wear; while the flow of oil, being from within outward, carries dust away from the contact surfaces, besides insuring constant lubrication easily regulated to meet the demands of use.

I claim as my invention and desire to secure by Letters Patent of the United States:—

1. In a universal joint the combination of a central spherical member having two circumferential grooves crossing at right angles; two bearing members or yokes each consisting of a shank for attachment to a shaft, recessed at its front end to a circumferential arc of the spherical member, each of the jaw-terminals at the arc surface thus formed having a segmental tooth of relatively short arc, projecting inwardly, adapted to fit the contour of the groove of the spherical member in a sliding engagement; and two semi-circular detachable straps each fitted to the contour of its groove of the spherical member and connecting the jaw-terminals of a yoke outwardly.

2. In a universal joint of the character indicated, an externally grooved central member constructed as a hollow spherical shell, inclosing a corresponding large chamber for the storage of an oil-supply, said shell being provided with a stoppered filling aperture between the grooves, and a plurality of minute feed apertures opening through the bottom of the grooves, adapted to feed oil automatically and continuously through the operation of the universal joint mechanism.

In testimony whereof I have hereunto set my hand in presence of two subscribing witnesses.

LEWIS M. HOSEA.

Witnesses:
JOSEPH R. GARDNER,
BENJAMIN H. EDWARDS.